United States Patent [19]

Lazarus

[11] Patent Number: 4,682,175

[45] Date of Patent: Jul. 21, 1987

[54] FREQUENCY MODULATED CONTINUOUS WAVE RADAR AND APPLICATION THEREOF TO A ALTIMETRIC PROBE

[75] Inventor: Michel Lazarus, Gif-sur-Yvette, France

[73] Assignee: Thomson CSF, Paris, France

[21] Appl. No.: 581,415

[22] Filed: Feb. 17, 1984

[30] Foreign Application Priority Data

Feb. 18, 1983 [FR] France ............................. 83 02721

[51] Int. Cl.$^4$ .............................................. G01S 13/32
[52] U.S. Cl. ...................................... 342/165; 342/122
[58] Field of Search ................... 343/14, 12 A, 12 R; 455/79, 80–83; 342/104, 122, 128, 159

[56] References Cited

U.S. PATENT DOCUMENTS

| | | | |
|---|---|---|---|
| 2,147,810 | 2/1939 | Alford | 343/12 A |
| 2,453,169 | 11/1948 | Varian | 343/14 R |
| 2,520,553 | 8/1950 | Lawson | 343/12 A |
| 2,760,057 | 8/1956 | Johannesen | 455/80 |
| 3,009,150 | 11/1961 | Castriota et al. | 455/79 |
| 3,735,402 | 5/1973 | Mosher | 343/14 |

FOREIGN PATENT DOCUMENTS 0000232 1/1984 Japan ..................................... 455/80

OTHER PUBLICATIONS

Bobrow, "Elementary Linear Circuit Analysis", 1981, p. 162, CBS College Publishing.
Skolnik, Merrill I., Introduction to Radar Systems, 1980, McGraw Hill, pp. 88–92.

Primary Examiner—Thomas H. Tarcza
Assistant Examiner—Mark Hellner
Attorney, Agent, or Firm—Cushman, Darby & Cushman

[57] ABSTRACT

Apparatus for reducing the composite coupling signal in a frequency modulated, continuous wave radar having a single antenna and a duplexer includes a modulation signal generator coupled to a continuous wave oscillator to provide input to the duplexer. A directional coupler at the duplexer input provides input to an adjustable phase-shifter which provides a phase-shifted signal to an RF mixer. The RF mixer receives a second input from the output of the duplexer and provides a mixed signal. A level modulator having an adjustable control input receives a portion of the modulated signal from the modulation signal generator. The level modulator then provides an output to the audio amplifier which also receives the mixed signal from the RF mixer. The audio amplifier provides an output signal having reduced composite coupling signal components.

10 Claims, 16 Drawing Figures

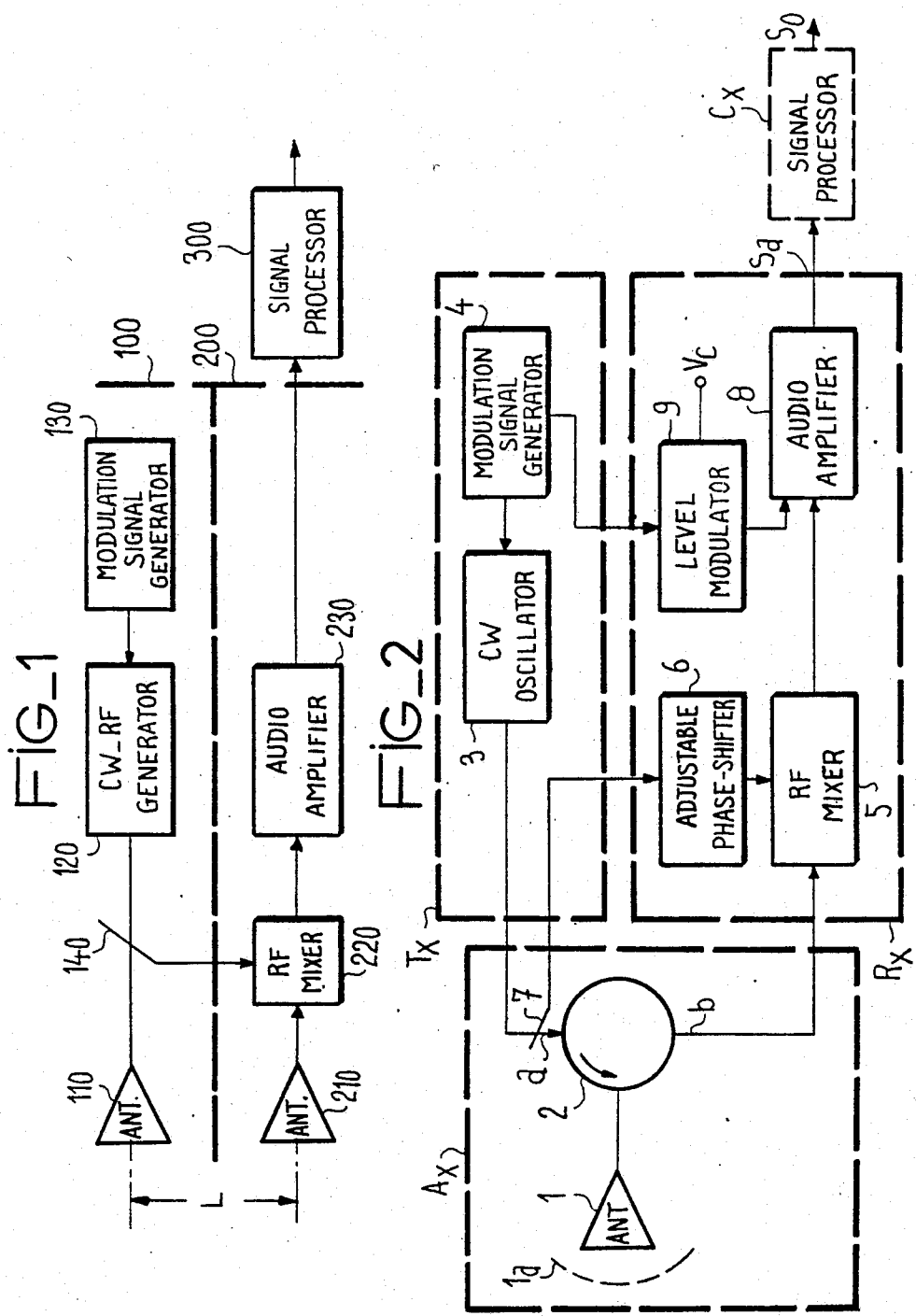

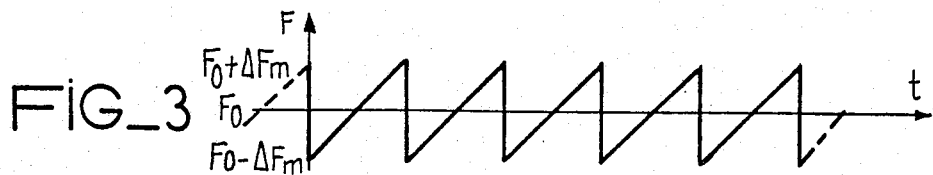
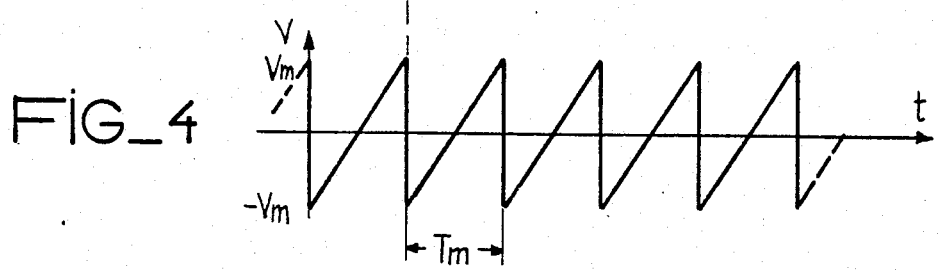
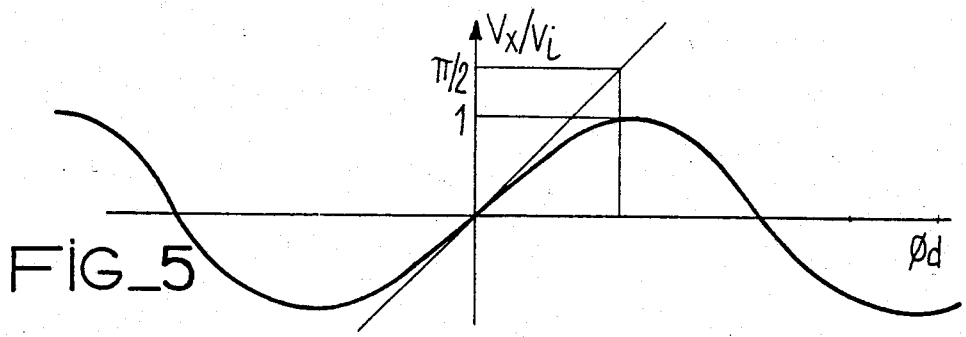
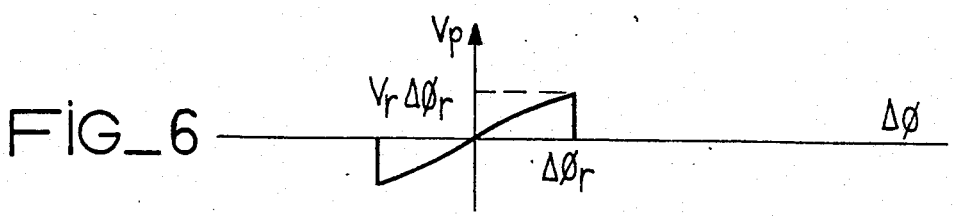
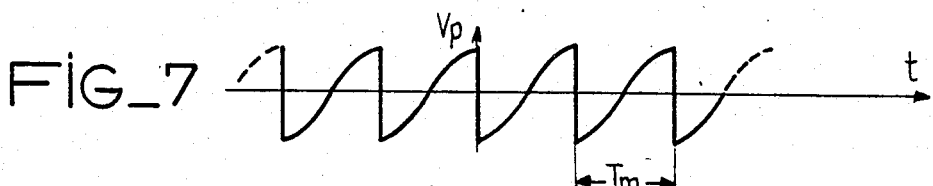
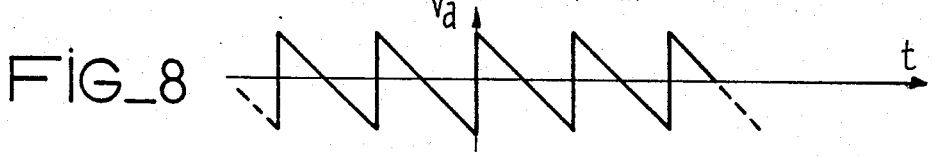
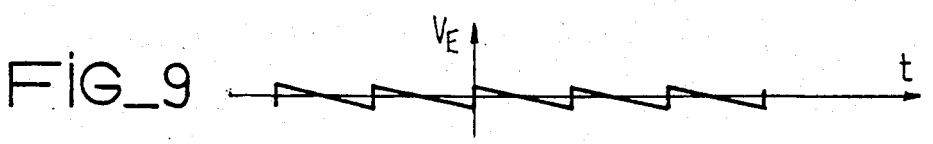

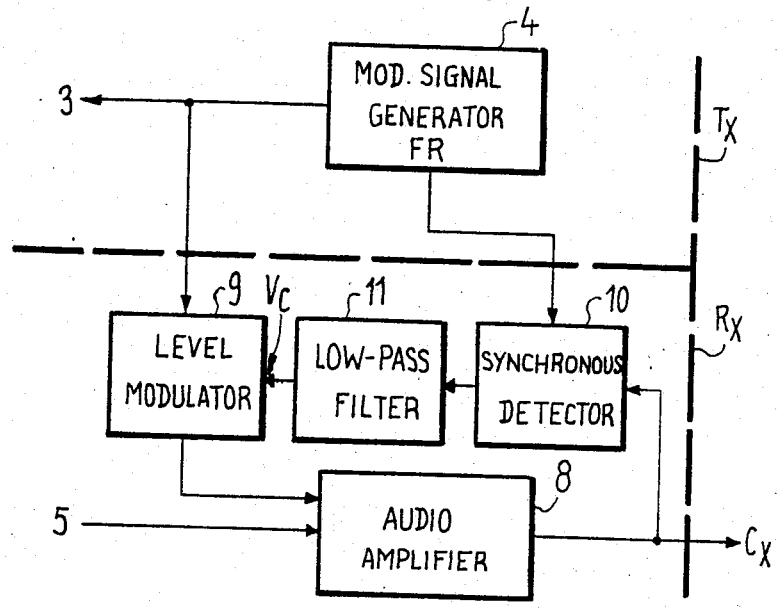
FIG_10
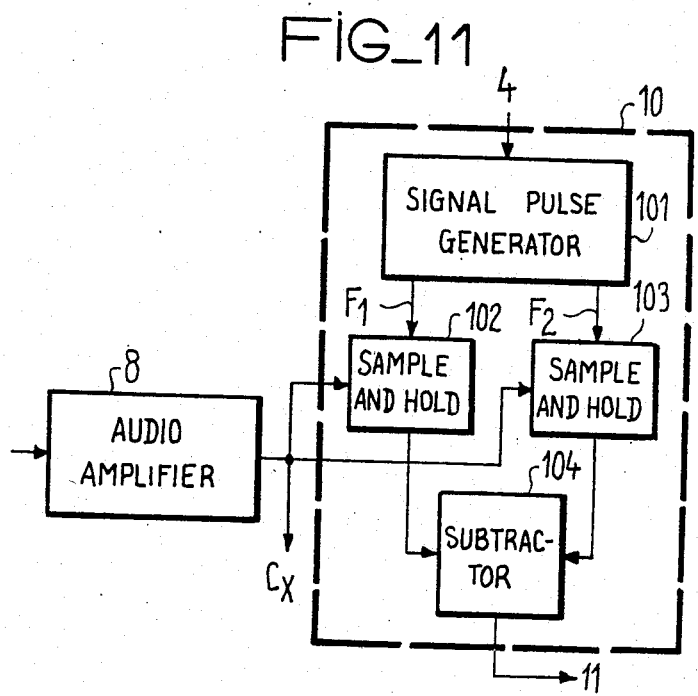
FIG_11

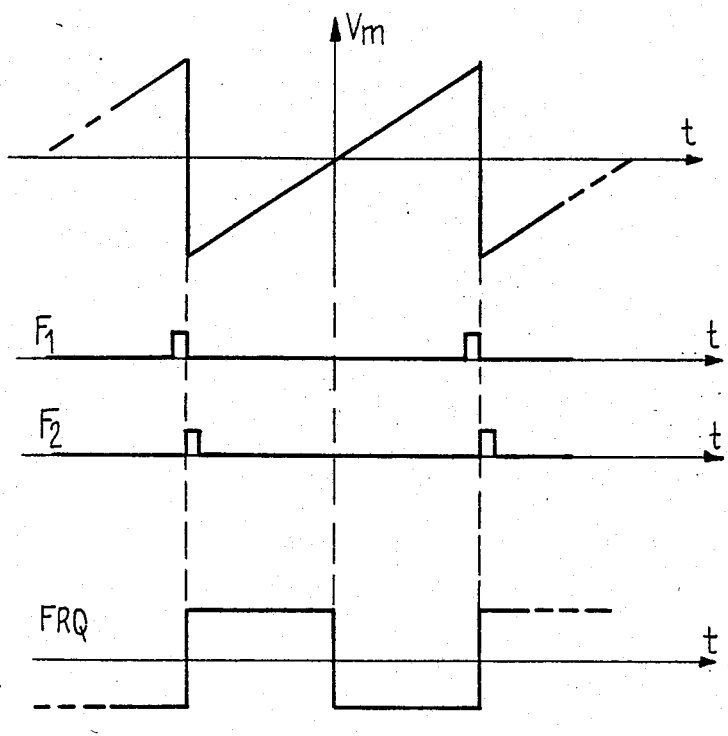
FIG_12
FIG_14
FIG_13
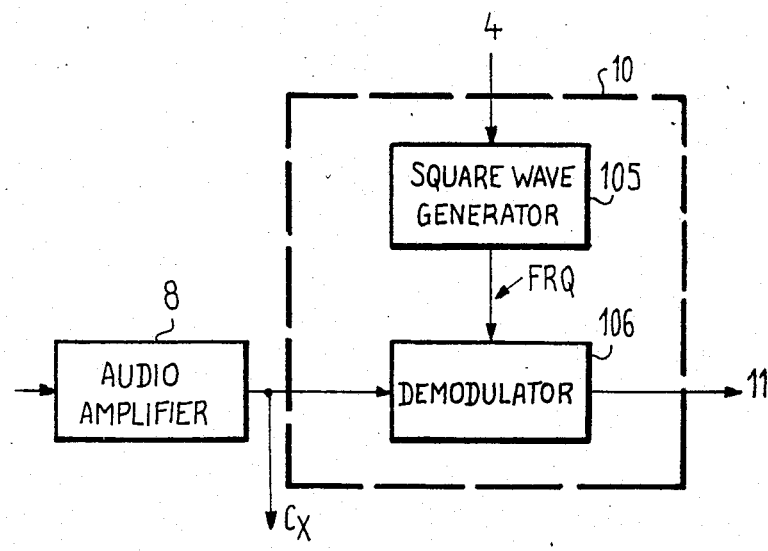

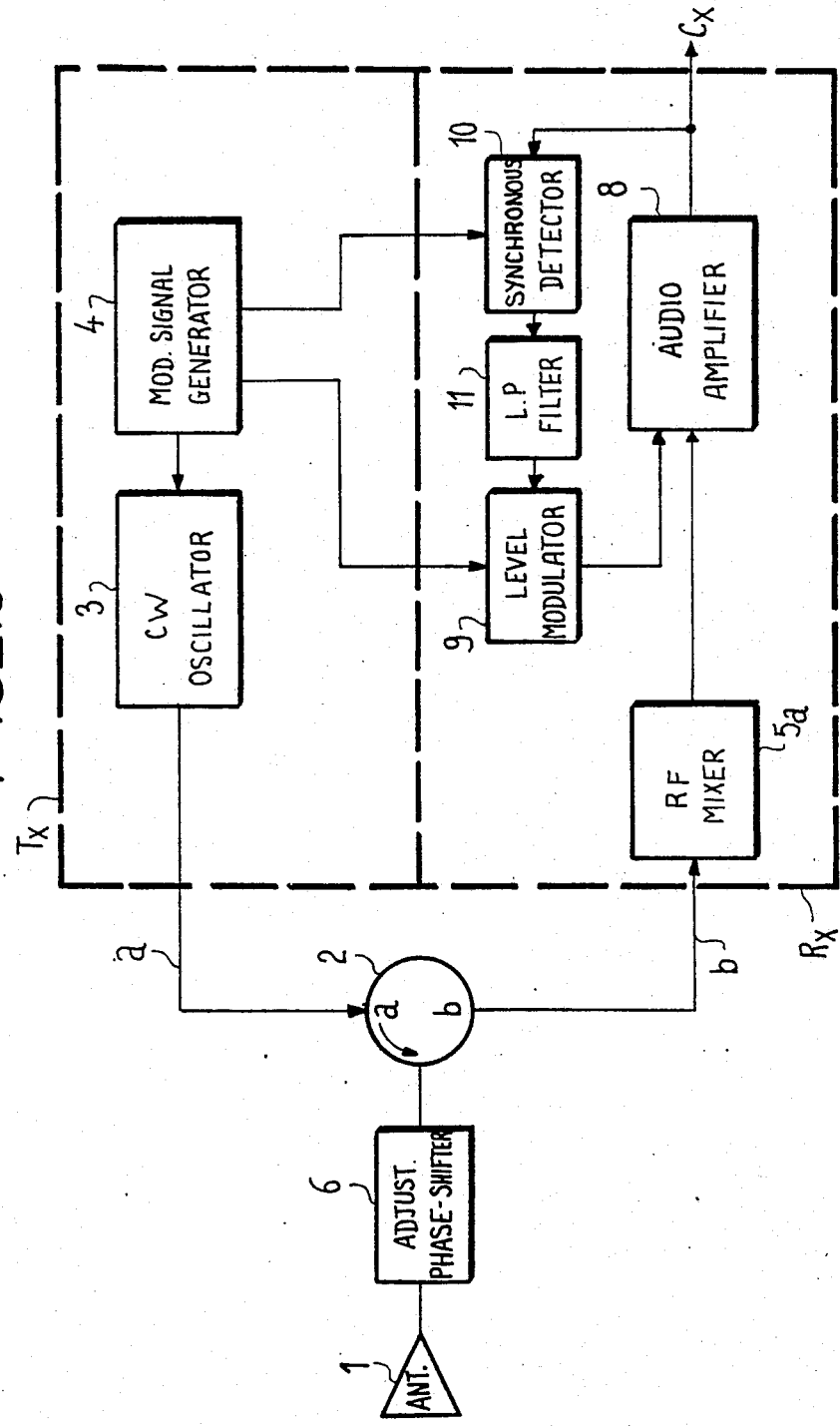

FIG_16
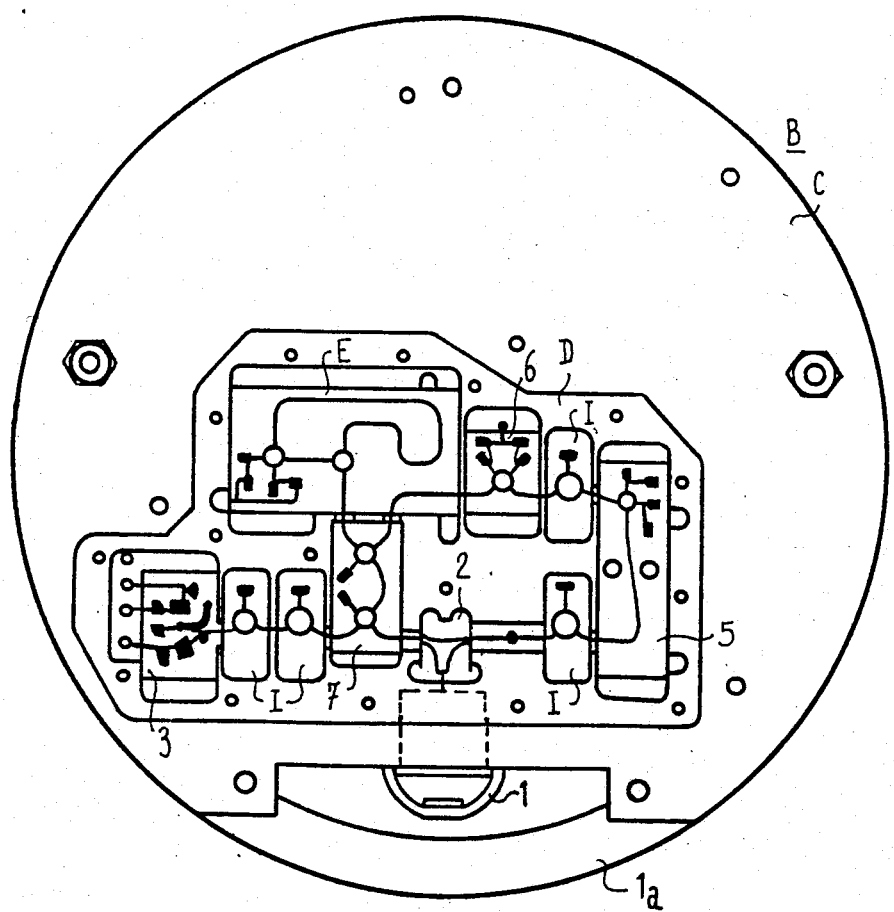

FREQUENCY MODULATED CONTINUOUS WAVE RADAR AND APPLICATION THEREOF TO A ALTIMETRIC PROBE

BACKGROUND OF THE INVENTION

1. Field of the Invention

The present invention relates to the technique of frequency modulated continuous wave radar systems; it relates more precisely to radar equipment for providing, over a wide distance range, a precise measurement of the relative distance away from a reflecting object; it also relates to a radioelectric altimetric probe.

2. Description of the Prior Art

The technique of frequency modulated continuous wave radars, or FM/CW radars, is widely known and described in numerous specialized works, This technique is almost numerous specialized works. This technique is almost universally used in aircraft radio altimeters and similar radar equipment. The main advantages of FM/CW radar reside in its relative simplicity of construction and in its capability of providing a precise measurement of the relative distance away from a reflecting object situated within its detection range. On the other hand, these FM/CW radars of the Prior Art present constructional restrictions and technical limitations which result from the requirement of having two separate antennas: a transmitting antenna and a receiving antenna, having generally radioelectric characteristics and identical mechanical structure. In fact, to ensure a sufficient radioelectric decoupling factor of the two antennas, so as to eliminate interferance phenomena between the transmitter and the receiver, the antennas must be physically remote from each other; certain radioelectric and mechanical problems arise therefore because of the fact that these antennas cannot be integrated in the equipment, but must be fixed to the wall of the carrier vehicle and interconnected with the equipment through transmission lines whose transmission delay must be measured; these transmission lines introduce propagation losses and multiple reflections of the transmitted signals. Moreover, when the relative distance from the object to be detected is extremely reduced, multiple path phenomena may appear between the object and the wall of the carrier vehicle, for example, when the object to be detected is formed by the ground or an obstacle of large extent; these multiple paths cause erroneous distance measurements. It may also be noted that, when the distance separating the antennas is no longer negligible with respect to the distance away from the object to be detected, the geometry of the antennae system becomes imperfect. In addition, among the mechanical problems raised by fixing the two antennas on the wall of the carrier vehicle, may be mentioned the requirement of reserving inside the vehicle housings for the antennas, passages for the transmission lines and accesses to the different connectors for installing and dismantling the different connections; finally, the electric continuity of the wall of the carrier vehicle must be preserved, which requires certain precautions to be taken during construction of the wall of the vehicle.

In FM/CW radar equipment, if the transmitted signal and the signal reflected by an object are duplexed on a common antenna, there is produced a composite coupling signal between the transmitter and the receiver; this composite coupling signal results mainly from a partial reflection at the level of the antenna which has a standing wave rate of a finite and not zero magnitude, and from a leak signal introduced by the duplexer circuit whose coefficient of directivity is logically limited. It follows then that this radio frequency composite coupling signal, after demodulation in the input mixer of the receiver, creates at the audio frequency amplifier of the receiver interference signals which are partially situated in the effective pass band of the echo signal; the result is a limitation in the sensitivity for detecting a close object.

The aim of the present invention is to overcome the above mentioned limitations of the FM/CW radars of the Prior Art.

SUMMARY OF THE INVENTION

For this, the present invention provides FM/CW radar equipment which comprises: a directional antenna which is coupled to a duplexer circuit having an input channel to which is connected a transmitter sub-assembly including a generator of a radio frequency continuous wave which is modulable in frequency by means of a signal generator providing a periodic modulation signal, and an output channel to which is connected a receiver sub-assembly including, connected in series: a radio frequency input mixer, (in one of the input channels of which is inserted an adjustable phase-shifter) and an audiofrequency amplifier having an input which is connected through a level modulator to the generator of the frequency modulation signal of the transmitter, this level modulator having a control input responsive to an adjustable DC voltage signal; and circuits for processing the output signals of the audiofrequency amplifier so as to provide a measurement of the relative distance away from an object detected by this equipment.

BRIEF DESCRIPTION OF THE DRAWINGS

Other features and advantages of the invention will appear from the following detailed description with reference to the accompanying drawings, in these drawings:

FIG. 1 shows FM/CW equipment of the prior art;

FIG. 2 shows a block diagram of the basic configuration of FW/CW radar equipment according to the invention;

FIG. 3 shows the frequency deviation law of the radio frequency signal transmitted as a function of time;

FIG. 4 shows the form of the frequency modulation signal of the transmitter;

FIG. 5 shows the standardized transfer characteristic of the balanced radio frequency mixer;

FIG. 6 shows the form of the transmitter-receiver coupling signal after modulation in the balanced mixer as a function of its differential phase;

FIG. 7 shows the form of the transmitter-receiver coupling signal after demodulation in the balanced mixer as a function of time;

FIG. 8 shows the form of the output signal of the level modulator;

FIG. 9 shows the form of the residual parasite signal at the output of the audiofrequency amplifier;

FIG. 10 shows the form of a block diagram the loop circuit for controlling the level modulator;

FIG. 11 shows in the form of a block diagram a first embodiment of the synchronous detector of the loop circuit;

FIG. 12 shows the form of the sampling signals supplied by the pulse generator of the synchronous detector;

FIG. 13 shows, in the form of a block diagram a second embodiment of the synchronous detector of the loop circuit;

FIG. 14 shows the form of the signal supplied by the signal generator of the synchronous detector;

FIG. 15 shows, in the form of a block diagram, another embodiment of the FM/CW radar equipment of FIG. 2; and FIG. 16 shows one method of constructing an altimetric probe for missiles.

DESCRIPTION OF THE PREFERRED EMBODIMENTS

FIG. 1 shows the conventional configuration of FM/CW radar equipment of the Prior Art. This radar comprises the following three sub-assemblies: a transmitter 100, a receiver 200 of the homodyne type and circuits 300 for processing the output signals of the receiver so as to provide, at least, an output signal So which carries the information of the relative distance away from a reflecting object detected by the equipment. the transmittor subassembly includes, connected in series, the following elements: a directional antenna 110, a radio frequency continuous wave generator 120 and a modulation signal generator 130; the receiver sub-assembly includes, connected in series, the following elements: an antenna 210, a radio frequency balance mixer 220 and an audiofrequency amplifier 230; the second input of the balanced mixer is connected to the output of the continuous wave generator 120 through a directional coupler 140. The distance L separating the transmission antennas 110 from the reception antennas 210 is determined so that the coupling signal between the transmitter and the receiver is at a sufficiently low level, determined by the detection performance of the equipment. The circuits 300 for processing the output signal of the receiver use the characteristics of the beat signal resulting from mixing, in the balanced mixer, the echo signals picked up by the reception antenna and of the reference signal available at the output of the directional coupler 140.

FIG. 2 shows, in the form of a block diagram, the basic configuration of FM/CW radar equipment in accordance with the invention, this equipment allowing, over a large distance range, and more especially at very short distances, of the order of a meter for example, the presence of a reflecting object to be detected and a measurement to be provided of the relative distance away from this object. Such FM/CW radar equipment comprises the following subassemblies: an antenna sub-assembly Ax having an input channel a, which channel is connected to a transmitter sub-assembly Tx which supplies a frequency modulated radio frequency continuous wave and an output channel b, which channel is connected to a receiver sub assembly Rx which supplies audiofrequency output signals Sa to a processing sub-assembly Cx which delivers a measurement signal So of the relative distance away from an object detected.

The antenna sub-assembly Ax comprises a directional antenna 1 which is possibly provided with a radome 1a; this antenna has a standing wave ratio (S.W.R.) whose maximum value is less than a given magnitude and a duplexer circuit 2 whose input and output channels are connected respectively to the transmitter Tx and receiver Rx sub-assemblies; this duplexer circuit may be formed by a conventional circulator.

The transmitter sub-assembly Tx comprises: a self oscillator 3 which provides a continuous radio frequency wave, with central frequency Fo and power Po, and a signal generator 4 which delivers a periodic signal for frequency modulation of the self oscillator and which comprises corresponding modulation means for deflecting the central frequency Fo between two perfectly defined endmost limits, $Fo-Fm$ and $Fo+Fm$.

The receiver sub-assembly Rx comprises, connected in series, the following elements: a balanced radio frequency mixer 5 and a low noise audiofrequency amplifier 8. The balanced mixer 5 has a reference channel which is connected through an adjustable phase-shifter 6 to a directional coupler 7, which directional coupler is inserted between the transmitter Tx and the duplexer circuit 2. The audiofrequency amplifier 8 comprises a second input channel which is connected through a level modulator 9 to the generator 4 of the signal for frequency modulation of the self oscillator 3. This level modulator 9 has a control channel responsive to an adjustalbe DC voltage source Vc. Such a level modulator may be formed by a balance modulator electronically controllable by means of a continuous control signal.

Constructionally, the transit time $\tau_1$ of the electric path between the directional coupler 7 and the signal input of the balanced mixer 5, via the directional antenna 1, is substantially equal to the transit time $\tau_2$ of the electric path between the directional coupler 7 and the reference input of the balanced mixer 5. Also constructionally the value of the S.W.R of the directional antenna 1 varies little in the radio frequency band of the equipment. This S.W.R being the main source of the signal coupling the transmitter to the receiver; another coupling source is provided by the duplexer circuit 2, generally to a lesser extent. So as to obtain optimum operation of the equipment, i.e. so as to reduce the level of the interferences produced by the parasite transmitter/receiver coupling signal, the frequency modulation characteristic of the transmitter must be linear; for this, the radio frequency self oscillator 2 may include a loop circuit comprising a linear frequency discriminator as reference element, which element may also be used for stabilizing the central frequency Fo of the radio frequency wave radiated by the directional antenna 1.

The circuits for processing the echo signal at the output of the audiofrequency amplifier 8 may be of a known type which uses the characteristics of this echo signal for providing a measurement signal of the distance from the detected object; consequently, these processing circuits are not described here.

The operation of the FM/CW radar equipment shown in FIG. 2 is described hereafter in the case, for example, of an application to the measurement of the altitude of an aircraft above the ground. It is assumed, by way of illustration, that the signal produced by generator 4 for frequency modulating the transmitter a linear saw tooth signal, shown in FIG. 4; this modulation signal has a recurrence period Tm and an amplitude Vm to which corresponds the frequency deflection $F_m$ on each side of the central frequency $F_o$ of the continuous radio frequency wave radiated by the directional antenna 1 as shown in FIG. 3.

The power level Pe of the echo signal reflected by the ground is given by the general formula:

$$Pe = P_oG_A \lambda 2_o\sigma_o/(4\pi)^2H^2$$

in which:
P$_o$ is the power level of the radio frequency signal radiated by the antenna;
G$_A$ the gain of the directional antenna, determined by the operational conditions of use of the equipment;
$\lambda_o = C/F_o$ the operating wave length of the equipment;
$\sigma_o$ the coefficient of reflectivity of the ground, and H the altitude of the aircraft above the ground.

The corresponding amplitude Ve of the echo signal at the signal input of the balanced mixer 5 is of the form:

$$Ve = K_oH^{-1}$$

and this echo signal is received with a time delay $\tau_e = 2H/C$.

If we assume that the power level of the leak signal of the duplexer circuit 2 is substantially less than that of the signal reflected by the directional antenna 1, the power P$_r$ of the transmitter-receiver coupling signal is given by the following relationship:

$$P_r = P_o\theta - 1^2/\theta + 1$$

in which the parameter $\theta$ is the magnitude od the S.W.R presented by the antenna. The amplitude Vr of the transmitter-receiver coupling signal at the signal input of the balanced mixer is then of the form:

$$V_r = K_I = \text{constant}$$

and this coupling signal is modified by a time delay $\tau_1$ proportional to the electric length of the directional coupler-balanced mixer connection via the antenna.

The power level P$_R$ of the reference signal supplied by the directional coupler 7 is given by the following relationship:

$$P_R = \alpha Po$$

in which the parameter $\alpha$ is the transmission coefficient of the directional coupler. The corresponding amplitude V$_R$ of the reference signal at the reference input of the balanced mixer 5 is of the form:

$$V_R = K_2 = \text{constant}.$$

Constructionally, the following condition is provided:
$K_1 < K_2$

FIG. 5 shows the standardized transfer characteristic Vx/Vi of a balanced mixer, or coherent detector, this standardized transfer characteristic is of the form:

$$Vx/Vi = \cos(\phi_R - \phi_i) = \cos \phi_d$$

where
Vx is the amplitude of the signal at the output of the mixer,
Vi is the amplitude of the input signal,
$\phi_d$ the relative phase between the phase $\phi_R$ of the reference signal and the phase $\phi_i$ of the input signal.

The adjustable phase shifter 6 introduces into the difference channel a phase shift $\phi_D$ so that, at the central frequency Fo of the input and reference signals, the following relationship:

$$2\pi.Fo\Delta\tau + \phi_D + (2K+1)\pi/2$$

is substantially satisified.

The maximum differential phase shift $\Delta\phi_r$ between the reference signal V$_R$ and the transmitter-receiver coupling signal Vr is given by the following relationship:

$$\Delta\phi_r = 2\pi.\Delta Fm(\tau_1 - \tau_2)$$

by construction, the magnitude $\Delta\tau = (\tau_1 - \tau_2)$ is small so that $\phi_r$ is substantially less than $\pi/2$; then the amplitude Vp of the resulting parasite signal of the transmitter-receiver coupling signal is given by the following relationship:

$$Vp = Vr\cos(\pi/2 + \Delta\phi_r) \# Vr\Delta\phi_r$$

as shown in FIG. 6.

The signal reflected by the ground and picked up by the antenna after a propagation delay $\tau_e$ is also demodulated in the balanced mixer and the maximum differential phase shift $\Delta\phi_e$ between the reference signal V$_R$ and the echo signal Ve is given by the following relationship:

$$\phi_e = 2\pi.\Delta Fm\tau 2 > \pi/2$$

thus, the echo signal at the output of the balance mixer is formed by a train of substantially sinusoidal signals defined by their "best frequency fb" given by the following relationship:

$$fb = \Delta Fm/Tm \, \tau e$$

This beat frequency fb is independent of the altitude H of the aircraft if the ratio $\tau e/Tm$ is held constant and, conversely, is proportional to the altitude H if the period Tm of the modulation signal of the transmitter is held at a fixed value.

FIG. 7 shows, as a function of time, the form of the transmitter-receiver coupling signal V$_P$ after demodulation in the balanced mixer 2 and FIG. 8 shows the signal at the output of the level modulator 9; this signal Va is identical to the frequency modulation signal Vm of the transmitter and its amplitude is proportional to the multiplication factor K$_3$ introduced by the level modulator, this factor K$_3$ being proportional to the value of the control voltage Vc. It results from the substraction of these two signals V$_P$ and V$_a$ at the input of the audiofrequency amplifier that the residual signal V$_\epsilon$, shown in FIG. 9, is reduced to an extremely low level. It may be noted that this cancelling circuit, formed by the level modulator 9 connected between the generator of the signal for frequency modulation of the transmitter and the second input of the audiofrequency amplifier has no effect on the echo signal which is normally amplified by the audiofrequency amplifier.

The relative time delay $\Delta\tau = (\tau_1 - \tau_2)$ resulting from the difference in electric length of the transmission lines between the direction coupler 7 and the input of the balanced mixer may be reduced, by appropriate construction, to a value of the order of $_{10}$ - 10 second. The adjustment range of the adjustable phase shifter 6 must be equal to $\pi/2$ radians at least.

Since the operation of the circuits for processing the echo signal available at the output of the audiofrequency amplifier are known, it is not described here.

In order to maintain the performance of the circuits for cancelling the transmission-reception coupling signal after demodulation in the receiver, it is preferable to make the magnitude of the DC voltage signal Vc, applied to the control input of the level modulator 9, dependent on the value of the residual signal V which appears at the output of the audiofrequency amplifier 8. For this purpose, the receiver comprises a loop circuit which is connected between the output of the audiofrequency amplifier and the control input of the level modulator, as shown in FIG. 10. This loop circuit comprises essentially a synchronized detector 10 whose signal input is connected to the output of the audiofrequency amplifier 8 and whose reference input is connected to generator 4 generating the signal for frequency modulation of the transmitter, and a low pass filter 11 which connected to the control input of the level modulator 9, this low pass filter being preferably of the active type and formed by a conventional integrator.

FIG. 11 shows, in the form of a block diagram, a first embodiment of the synchronous detector 10 shown in FIG. 10, this synchronous detector operating with a saw tooth reference signal. In this first embodiment, the synchronous detector 10 comprises a generator 101 which provides two pulse signals $F_1$ and $F_2$ which are positioned in time on each side of the return front of the saw tooth modulation signal as shown in FIG. 12, in which the pulse signals $F_1$ and $F_2$ are shown opposite the saw tooth modulation signal. The pulse signals $F_1$ and $F_2$, or sampling pulses, are supplied respectively to the control inputs of two sample and hold devices 102 and 103, these circuits having a common input which is connected to the output of the audiofrequency amplifier 8. The output of these two sample and hold devices is connected to a subtractor circuit 104, whose output is connected to the input of the low pass filter 11.

FIG. 13 shows in the form of a block diagram a second embodiment of the synchronous detector 10, shown in FIG. 11, this detector also operating with a saw tooth reference signal. In this second embodiment, the synchronous detector 10 comprises a generator 105 which supplies a square wave signal FRQ shown in FIG. 14 opposite the saw tooth modulation signal of FIG. 12, and a balanced demodulator 106 whose control input is connected to the generator of the square wave signal and whose signal input is connected to the output of the audiofrequency amplifier 8. The output of the balanced demodulator 106 is connected to the input of the low pass filter 11.

FIG. 15 shows, in the form of a block diagram, a constructional variant of the FM/CW radar equipment described in connection with FIG. 2. In this variant, the receiver sub assembly RX comprises an input mixer 5a of the unbalanced type in which the input channels are partially common; consequently, the adjustable phase shifter 6 for adjusting the relative phase of the reference and the transmission-reception coupling signals is inserted between the directional antenna 1 and the duplexer circuit 2. So as to minimize the differential delay time between the transmission-reception coupling signal, the length of the antenna-duplexer connection must be reduced to a minimum value. In a first construction, the directivity coefficient of the duplexer circuit 2 is determined so as to obtain in the output channel b a signal level substantially greater than that of the signal reflected by the directional antenna. In a slightly different construction, the value of the directivity coefficient of the duplexer circuit is made maximum and the value of the S.W.R of the directional antenna is adjusted so as to obtain a level of the reflected signal which is substantially greater than that of the leak signal of the duplexer circuit. It should however be noted that the detection sensitivity of a receiver comprising a mixer with unbalanced input is substantially less than that provided by a receiver having a balanced input mixer since the parasite modulations and amplitude noises of the reference signal are not eliminated.

In what follows, one particular application of the invention will be described to a radioelectric altimetric probe intended for a missile capable of moving rapidly in the vicinity of the ground. By way of illustration, such a missily may fly at an altitude of a few meters above a surface of water and the lower distance measuring limit is situated at about a meter, whereas the upper distance measuring limit may reach a 100 meters. Generally, a missile is formed by the association of specialized sections, all identical in diameter. The electric characteristics of an altimetric probe such as considered here may be the following: the central operating frequency may be situated in the micro-wave frequency band between 5 and 15 GHz for which propagation in the low atmosphere over reduced distances in practically undisturbed. The power level of the micro wave signal radiated by the antenna 1 is of the order of a few tens of mW for an antenna gain of about 13 dB; the frequency deviation of the carrier frequency may be of the order of 250 MHz peak to peak.

FIG. 16 shows a construction of an altimetric probe intended for a missile. This probe comprises a rigid case B cylindrical in shape which forms one of the specialized sections of the body of the missile. This case comprises at its periphery a housing in which is rigidly fixed a directional antenna 1 protected by a radome 1a. This case also comprises a partition wall C, including a cavity D in the bottom of which is mounted a hybrid circuit which groups together the different microwave components of the transmitter and receiver sub assemblies: the duplexer circuit 2, the balanced mixer 5, the adjustable phase shifter 6, the directional coupler 7, the micro oscillator 3 and associated elements such as isolators I, and micro circuits E of the means for linearizing the frequency modulation characteristic of the micro wave oscillator 3. This hybrid circuit receives a lid not shown in the Figure. Finally, printed circuit cards are fitted inside the case; on these printed circuit cards are grouped together the electronic circuits such as the generator generating the signal for frequency modulation of the transmitter, the audiofrequency amplifier, the circuits for cancelling the transmitter-receiver coupling signal and the circuits for processing the output signal of the receiver.

The invention is not limited in its characteristics and applications to the embodiment described in detail here above. In fact, the form of the signal for frequency modulating the transmitted wave may be different, for example triangular or sinusoidal, but also other signal forms, because of the linear characteristics of the circuits for cancelling the transmitter-receiver coupling signal. The transmitter sub-assembly may be formed in a different way, depending on the type of components used: GUNN or IMPATT diode or else FET microwave transistors.

The invention finds its application in radio altimeters for aircraft, obstacle detectors, proximity fuses for missiles, sensors for ships coming alongside the quay, sensors for coupling satellites, and generally in equipment intended for the precise radioelectric measurement of a distance.

What is claimed is:

1. Apparatus for reducing the composite coupling signal in a frequency modulated, continuous wave radar having a single antenna and a duplexer, comprising:
   modulation means for providing a modulation signal;
   oscillation means for receiving said modulation signal, and adapted for providing a modulated, continuous wave signal to an input of said duplexer;
   phase shift means for receiving said modulated, continuous wave signal and providing a phase-shifted, modulated, continuous wave signal;
   mixer means adapted for receiving a received signal from an output of said duplexer, and for mixing said received signal with said phase-shifted, modulated, continuous wave signal to provide a mixed signal;
   injection means, having a first input coupled to said modulation means and a second input for receiving a DC control input signal, for providing an injection signal related to said modulated signal and to said control input signal; and
   amplifier means for receiving said injection signal and said mixed signal and providing an output signal having reduced composite coupling signal components.

2. Apparatus according to claim 1 wherein said injection means includes an amplitude modulator adapted to be responsive to an adjustable, continuous control input signal.

3. Apparatus according to claim 2 further including loop circuit means coupled between an output of said amplifier means and said amplitude modulator means, for providing said adjustable, continuous control input signal, to said amplitude modulator means.

4. Apparatus according to claim 1 further including a directional coupler, adapted to be coupled between said duplexer input and said oscillation means, for providing said modulated, continuous wave signal to said phase shift means.

5. Apparatus according to claim 4 wherein a channel length between said directional coupler and said mixer means through said phase shift means is substantially equal to a channel length between said duplexer output and said mixer means.

6. Apparatus for reducing the composite coupling signal in an altimeter probe having a single antenna and a duplexer, comprising:
   modulation means for providing a modulation signal;
   oscillation means for receiving said modulation signal, and adapted for providing a modulated, continuous wave signal to an input of said duplexer;
   phase shift means for receiving said modulated, continuous wave signal and providing a phase-shifted, modulated, continuous wave signal;
   mixer means adapted for receiving a received signal from an output of said duplexer, and for mixing said received signal with said phase-shifted, modulated, continuous wave signal to provide a mixed signal;
   injection means, coupled to said modulation means, for providing an injection signal related to said modulation signal, said injection means including an amplitude modulator responsive to an adjustable, continuous signal, control input;
   amplifier means for receiving said injection signal and said mixed signal and providing an output signal having reduced composite coupling signal components; and
   loop circuit means coupled between an output of said amplifier means and said amplitude modulator, for providing said adjustable, continuous signal, control input to said amplitude modulator.

7. Apparatus according to claim 6 wherein said loop circuit includes:
   A synchronous detector receiving said output signal from said amplifier means and said modulation signal from said modulation means; and
   filter means for receiving an output from said synchronous detector and for providing an input to said amplitude modulator.

8. Apparatus according to claim 7 wherein said synchronous detector includes:
   signal pulse generator means for receiving said modulation signal and for providing first and second pulse signals;
   first and second sample and hold circuits receiving said first and second pulse signals respectively, each sample and hold circuit receiving said output signal from said amplifier means, for providing first and second signals, respectively; and
   subtractor means for receiving said first and second signals, and for providing a subtracted signal to said filter means.

9. Apparatus according to claim 7 wherein said synchronous detector includes:
   square wave generator means, for receiving said modulated signal, and for providing a square wave output signal; and
   demodulator means, for receiving said output signal from said amplifier means and said square wave output signal, and for providing a demodulated output signal to said filter means.

10. Apparatus for reducing composite coupling signals in a frequency modulated, continuous wave radar having a single antenna coupled to an adjustable phase-shifter which is coupled to a duplexer, comprising:
    modulation means for providing a modulation signal;
    oscillation means for receiving said modulation signal, and adapted for providing a modulated, continuous wave signal to an input of said duplexer;
    mixer means adapted for receiving a received signal from an output of said duplexer, and for providing a mixed signal;
    modulator means for receiving said modulation signal from said modulation means and providing a modulated signal;
    amplifier means for receiving said modulated signal and said mixed signal, and for providing an output signal having reduced composite coupling signal components;
    synchronous detector means for receiving said output signal from said amplifier means and said modulation signal from said modulation means, and for providing a signal output; and
    filter means for receiving said signal output from said synchronous detector means and providing a filtered signal to said modulator means.

* * * * *